US008664342B2

(12) United States Patent
Bordais et al.

(10) Patent No.: US 8,664,342 B2
(45) Date of Patent: *Mar. 4, 2014

(54) PROCESS FOR THE INTRODUCTION OF A POLYMERISATION CATALYST INTO A GAS-PHASE FLUIDISED BED

(75) Inventors: Bruno Bordais, Domaine plein Sud (FR); Christohper James Kemp, London (GB); Jose Andre Laille, Salon de Provence (FR); Willy Lemesle, Vitrolles (FR)

(73) Assignee: Ineos Commercial Services UK Limited, Hampshire (GB)

( * ) Notice: Subject to any disclaimer, the term of this patent is extended or adjusted under 35 U.S.C. 154(b) by 456 days.

This patent is subject to a terminal disclaimer.

(21) Appl. No.: 12/737,864

(22) PCT Filed: Sep. 21, 2009

(86) PCT No.: PCT/EP2009/062182
§ 371 (c)(1),
(2), (4) Date: Feb. 24, 2011

(87) PCT Pub. No.: WO2010/037651
PCT Pub. Date: Apr. 8, 2010

(65) Prior Publication Data
US 2011/0152473 A1      Jun. 23, 2011

(30) Foreign Application Priority Data
Oct. 3, 2008   (EP) .................................... 08165811

(51) Int. Cl.
*C08F 2/01*    (2006.01)
*B01J 8/24*    (2006.01)

(52) U.S. Cl.
USPC .............................. 526/86; 422/145; 422/310

(58) Field of Classification Search
USPC ......................................................... 526/86
See application file for complete search history.

(56) References Cited

U.S. PATENT DOCUMENTS

| 4,525,547 A | 6/1985 | Kato et al. |
|---|---|---|
| 5,310,833 A | 5/1994 | Kubo et al. |
| 5,693,727 A | 12/1997 | Goode et al. |
| 6,088,934 A | 7/2000 | Newton |
| 6,489,408 B2 | 12/2002 | Mawson et al. |
| 6,689,847 B2 | 2/2004 | Mawson et al. |
| 2003/0153695 A1 | 8/2003 | Braganca et al. |
| 2004/0214968 A1 | 10/2004 | Berhalter et al. |
| 2012/0130029 A1 * | 5/2012 | Bordais et al. .................. 526/88 |

FOREIGN PATENT DOCUMENTS

| GB | 2 274 110 A | 7/1994 | |
|---|---|---|---|
| WO | WO 99/61486 A1 | 12/1999 | |
| WO | WO 2004/092229 A1 | 10/2004 | |
| WO | WO 2004092229 A1 * | 10/2004 | ............. C08F 10/00 |
| WO | WO 2006/085051 A1 | 8/2006 | |
| WO | WO 2008/042078 A1 | 4/2008 | |
| WO | WO 2008/042182 A1 | 4/2008 | |
| WO | WO 2008042078 A1 * | 4/2008 | |

* cited by examiner

*Primary Examiner* — David Buttner
*Assistant Examiner* — Elizabeth Eng
(74) *Attorney, Agent, or Firm* — Nixon & Vanderhye

(57) ABSTRACT

Process for introducing a solid polymerization catalyst into a gas-phase fluidized bed using an injection device having an inner tube of internal cross-sectional area of 10 to 100 mm$^2$ and an outer tube forming an annulus around the inner tube with a cross-sectional area of 1 to 10 times the internal cross-sectional area of the inner tube. The polymerization catalyst and a carrier gas are passed through the inner tube and into the gas-phase fluidized bed at a carrier gas linear velocity of 4 to 14 m/s and a carrier gas mass flow rate of 10-35 kg/h. A shielding gas is passed through the outer tube and into the gas-phase fluidized bed at a linear velocity of 1 to 10 times the carrier gas linear velocity through the inner tube and at a mass flow rate of 100-500 kg/h. No cooled recycle process gas is provided to the injection device.

22 Claims, No Drawings

PROCESS FOR THE INTRODUCTION OF A POLYMERISATION CATALYST INTO A GAS-PHASE FLUIDISED BED

This application is the U.S. national phase of International Application No. PCT/EP2009/062182 filed 21 Sep. 2009 which designated the U.S. and claims priority to European Application No. 08165811.4 filed 3 Oct. 2008, the entire contents of each of which are hereby incorporated by reference.

The present invention relates to a process for polymerisation in a gas-phase fluidised bed, and in particular to a process for the introduction of a polymerisation catalyst in solid form into a gas-phase fluidised bed using an injection device.

Processes for the polymerization of olefins are well known in the art. Such processes can be conducted, for example, by introducing an olefinic monomer and other reagents, such as comonomers, chain transfer agents and inert reagents, into a polymerization reactor comprising polyolefin and a catalyst for the polymerization.

A number of different types of catalyst are also known for use in polymerisations, including so-called "Philips" catalysts, Ziegler-Natta catalysts and metallocene catalysts. Typically they are provided and used in solid form, although liquid catalysts are also known.

Issues with catalyst injection have been considered previously. U.S. Pat. No. 5,693,727, for example, relates to a process for introduction of a liquid catalyst into a fluidised bed. In particular, U.S. Pat. No. 5,693,727 teaches injection of a liquid catalyst through a central nozzle, which, at injection into the bed is surrounded by at least one gas which serves to move or deflect resin particles of the bed out of the way of the liquid catalyst as it enters the fluidisation zone to provide a so-called "particle lean zone".

A similar device is also used in U.S. Pat. No. 6,489,408 for injection of solid catalyst particles, and in which a cooled recycle process gas is used as a "particle deflecting gas".

It has now been found that the use of cooled recycle process gas as a particle deflecting gas, whilst convenient in the sense that such a stream is readily available, can suffer from problems due to the presence in said gas of fines and other components which can cause blocking of the injection device and/or fouling. Thus, an improved process for injection of catalyst into a fluidised bed is desired.

Whilst gases other than process gas have been proposed for similar devices, the devices used generally use relatively high flows of the monomer. For example, a further variation on injection devices is disclosed in WO 2008/42078. In this document, a nozzle is provided having a central conduit surrounded by two annuluses. A plurality of apertures are provided between the central conduit and the first annulus to allow fluid to pass into the annulus and mix with a catalyst slurry therein prior to the exit of the injection device. The outer annulus may be provided with monomer flow, but the flow rates used are relatively high, being between 455 and 2273 kg/hr.

Thus, in a first aspect, the present invention provides a process for the introduction of a polymerisation catalyst in solid form into a gas-phase fluidised bed, which process comprises using an injection device having an inner tube of internal cross-sectional area of 10 to 100 mm$^2$ and an outer tube forming an annulus around said inner tube with a cross-sectional area of 1 to 10 times the internal cross-sectional area of the inner tube, and passing said polymerisation catalyst and a carrier gas through the inner tube and into the gas-phase fluidised bed at a linear velocity of said carrier gas of 4 to 14 m/s and at a mass flow rate of carrier gas in the range 10-35 kg/h, and passing a shielding gas through the outer tube and into the gas-phase fluidised bed at a linear velocity of said shielding gas of 1 to 10 times the linear velocity of the carrier gas through the inner tube and at a mass flow rate of the shielding gas in the range 100-500 kg/h, wherein no cooled recycle process gas is provided to the injection device.

The present invention advantageously utilises as carrier gas and shielding gas, streams other than recycle process gas. Thus, no recycle process gas is provided to the injection device. When using "fresh" gases rather than recycle gas, it is generally desirable to minimise the amount of gas passed through the injection device. In the present invention, it has been found that suitable shielding for the catalyst injection may be achieved by use of inner and outer tubes of relatively low cross-sectional areas at their respective outlets. In particular, with respect to the outer tube, the use of an annulus through which the shielding gas is passed that is relatively small reduces the total volume of shielding gas required to obtain a specific linear velocity. In the process of the present invention the linear velocity of said shielding gas is maintained at a value at least equal to the linear velocity of the carrier gas to ensure that the catalyst is not contacted with the fluidised bed immediately at the exit of the injection device, but this is achieved with a relatively low flow rate of shielding gas relative to the carrier gas compared to prior art patents by using an injection device of relatively small and also specific relative dimensions.

The inner and outer tubes are preferably of circular cross-section.

The injection device has an inner tube of internal cross-sectional area of 10 to 100 mm$^2$. In general, it is simpler to manufacture a tube with constant internal cross-section (subject to machining tolerances). For avoidance of doubt, however, a tube with varying internal cross-section along its length may be used, in which case the relevant internal cross-sectional area is that at the opening at the tip on the inner tube. Preferably the internal cross-sectional area of the inner tube is of 10 to 50 mm$^2$.

The injection device also has an outer tube forming an annulus around said inner tube with a cross-sectional area of 1 to 10 times the internal cross-sectional area of the inner tube. Preferably, the annulus has a cross-sectional area of at least 2, and more preferably 2 to 5, times the internal cross-sectional area of the inner tube. Preferably, the cross-sectional area of the annulus is less than 500 mm$^2$, for example less than 250 mm$^2$, and most preferably is in the range 50 to 150 mm$^2$.

The cross-sectional area of the annulus is the area between the external surface of the inner tube and the internal surface of the outer tube, which is usually, and preferably, a ring-shaped area. For avoidance of doubt, in case of variation of the annulus with length along the inner or outer tubes, the relevant cross-sectional area of the annulus is the area between the external surface of the inner tube and the internal surface of the outer tube at the opening at the tip on the inner tube.

Ideally, the inner tube and the outer tube are concentric. However, an off-set from such a concentric configuration may be present and may be tolerated as long as the shielding gas is passed completely around the carrier gas and catalyst exiting the inner tube.

In the process according to the present invention the polymerisation catalyst and a carrier gas are passed through the inner tube and into the gas-phase fluidised bed at a linear velocity of said carrier gas of 4 to 14 m/s. The linear velocity is preferably 4 to 10 m/s. The mass flow rate of carrier gas is in the range 10-35 kg/h, preferably in the range 15-25 kg/h.

The shielding gas is passed through the outer tube and into the gas-phase fluidised bed at a linear velocity of said shielding gas of 1 to 10 times the linear velocity of the carrier gas through the inner tube and at a mass flow rate of the shielding gas in the range 100-500 kg/h.

Preferably, the shielding gas is passed through the outer tube and into the gas-phase fluidised bed at a linear velocity of said shielding gas of 3 to 8 times the linear velocity of the carrier gas through the inner tube. Preferably, the linear velocity of the shielding gas is less than 50 m/s, for example 20 to 50 m/s.

As noted above, the injection according to the process of the present invention is achieved with a relatively low mass flow rate of shielding gas relative to the carrier gas. The upper limit on the velocity/mass flow rate of the carrier gas is also important however because increased velocity of shielding gas entering the reactor (due to increased mass flow rate) can start to lead to significantly increased attrition of the catalyst particles entering the reactor. Therefore, subject to achieving suitable "shielding" the velocity and mass flow rate should be minimised.

Preferably the mass flow rate of the shielding gas is less than 400 kg/h, more preferably in the range 100-300 kg/h.

Typically, the ratio of the mass flow rate of the shielding gas to the mass flow rate of the carrier gas is less than 20, and preferably less than 15, for example in the range 5 to 15.

For avoidance of doubt, the linear velocity of said streams is as measured or calculated at the opening at the tip on the inner tube and in the annulus adjacent to the opening at the tip on the inner tube respectively. The linear velocity of each gas at said points can be readily calculated from the total flow of the respective gas and the relevant cross-sectional area.

The process of the present invention is sufficient to ensure penetration of the catalyst particles in the carrier gas into the fluidised bed of polymer particles by a distance of 0.1-0.4 m, which is sufficiently away from the injection device to avoid fouling thereon.

No cooled recycle process gas is provided to the injection device of the present invention.

The injection device preferably comprises only the inner and outer tubes already described, and no additional tubes. Such a device is much simpler than that described in WO 2008/42078, for example.

The carrier gas is suitably selected from olefins and inert gases, or mixtures thereof. The carrier gas is preferably selected from ethylene and nitrogen, more preferably nitrogen.

In contrast, the shielding gas preferably has less than 50% inert gases, more preferably less than 25% inert gases, for example less than 10% inert gases, and most preferably is essentially free of inert gases, by which is meant comprises less than 1%, all amounts being by volume.

Preferably, the shielding gas comprises at least 50% hydrocarbons, more preferably at least 90% olefins, especially at least 95% olefins, again all amounts being by volume.

The most preferred composition of the shielding gas is also catalyst dependent. Thus, for use with metallocene catalysts it is preferred that the shielding gas comprises predominantly ethylene, by which is meant comprises at least 50% by volume of ethylene, and even more preferably with essentially no co-monomer, by which is meant comprises less than 1% by volume of comonomer. This is because of the relatively high propensity of metallocene catalysts to incorporate heavier comonomers. In contrast, for use with Ziegler-Natta catalysts co-monomer in the shielding gas is acceptable and even preferable. In this scenario the shielding gas most preferably comprises at least 1% by volume, such as at least 2% by volume, of comonomer.

The shielding gas may also include other components such as antistatic additives and/or hydrogen.

As noted above, it is also particularly advantageous that the shielding gas does not comprise recycle process gas because such streams generally comprise fines etc. that it is not desirable to recycle via the injection device in case they cause blocking of the injection device and/or fouling. In particular, the use of a shielding gas other than a recycle process gas has been found to reduce formation of agglomerates in the reactor.

Further, by selecting a shielding gas such as ethylene which is relatively "pure" it is possible to use a shielding gas at a lower temperature than would be possible with recycle process gas, from which "heavy" components would be likely to condense if cooled too far.

EXAMPLES

Reactions were performed in a fluidised bed reactor having a diameter of 5 m, using a metallocene HPLL catalyst prepared according to Example 1 of WO 2006/085051, and with a reaction mixture comprising ethylene, 1-hexene, hydrogen, ethane, pentane and a balance of nitrogen.

An injection device is provided for injection of the catalyst into the reactor, and having the following dimensions:

Internal diameter of inner tube=6.0 mm

Outer diameter of inner tube=8.0 mm

Internal diameter of outer tube=13.0 mm

Internal cross-sectional area of inner tube=28.3 mm$^2$

Cross-sectional area of annulus=82.5 mm$^2$

Nitrogen was used as the carrier gas in all Examples.

The experimental conditions used in the injection device are as follows:

| Ex. | process gas density, kg/m3 * | annulus ethylene flow, kg/h | annulus process gas flow, kg/h | annulus velocity, m/s | N2 flow, kg/h, min | N2 flow, kg/h, max | inner velocity m/s, min | Velocity ratio | inner velocity m/s, max | Velocity ratio |
|---|---|---|---|---|---|---|---|---|---|---|
| 1 | 21.90 | 0.00 | 130.00 | 19.99 | 7.00 | 25.00 | 3.54 | 5.65 | 12.64 | 1.58 |
| 2 | 22.20 | 0.00 | 135.00 | 20.48 | 10.00 | 18.50 | 5.06 | 4.05 | 9.35 | 2.19 |
| 3 | 22.60 | 0.00 | 200.00 | 29.80 | 10.00 | 10.00 | 5.06 | 5.89 | 5.06 | 5.89 |
| 4 | 22.70 | 130.00 | 0.00 | 22.14 | 20.00 | 20.00 | 10.11 | 2.19 | 10.11 | 2.19 |
| 5 | 23.00 | 280.00 | 0.00 | 47.69 | 20.00 | 20.00 | 10.11 | 4.7 | 10.11 | 4.7 |

* The change in gas density is a result of slight changes in process conditions resulting from reduced reaction temperature and an increase in pentane in the reactor as production rate is increased.

Comparative Examples 1-3

In Comparative Examples 1 to 3, process gas was used as the shielding gas.

In Example 1, process gas was used as the shielding gas with a flow rate of 130 kg/h and a linear velocity of 20 m/s. Initial nitrogen flow was 7 kg/h, corresponding to a linear velocity of 3.54 m/s. The flow rate ratio of process gas compared to nitrogen (carrier gas) was initially 5.65. Over the course of the experiment, the flow rate of nitrogen in the inner tube was increased to 25 kg/h nitrogen (12.64 m/s), with a corresponding reduction in the ratio of process as to nitrogen. However, significant levels of formation of agglomerates were observed under all nitrogen flow conditions. The reaction had to be stopped after approximately 170 hours, with the maximum production rate achieved corresponding to 14.4 Tonnes/hour.

Example 2 is similar to Example 1 except starting with a slightly increased process gas flow (135 kg/h, 20.5 m/s) and initial nitrogen flow (10 kg/h, 5.06 m/s). Over the course of the experiment, the flow rate of nitrogen in the inner tube was increased to 18.5 kg/h nitrogen (9.35 m/s). Again, significant levels of formation of agglomerates were observed under all nitrogen flow conditions. The reaction was stopped after approximately 140 hours, with the maximum production rate achieved corresponding to 14.1 Tonnes/hour.

Example 3 demonstrates the effect of increased process gas flow as shielding gas, with a further increased flow of process gas compared to Example 2 (200 kg/h, 29.8 m/s). Agglomerates formation was again seen, similar to Example 2, and the reaction was stopped after approximately 50 hours with the maximum production rate achieved corresponding to 14.0 Tonnes/hour (no nitrogen increase was performed).

The above Examples illustrate the problems of agglomerate formation using process gas as the shielding gas, and that the problems are not alleviated by increasing either the nitrogen flow rate (carrier gas) or process gas flow rate (shielding gas).

Examples 4 and 5

Examples 4 and 5 illustrate the process of the present invention, using ethylene as the shielding gas.

In Example 4, ethylene was used as the shielding gas instead of process gas, at a flow rate of 130 kg/h (22.1 m/s). The flow rate of the shielding gas is thus similar to that of Examples 1 to 3. Operation proceeded smoothly and it was found that an increased flow rate of nitrogen as carrier gas and increased catalyst injection rate could be achieved by the use of ethylene as the shielding gas. In particular, despite the flow rate of shielding gas compared to nitrogen (carrier gas) being reduced significantly compared to Examples 1 to 3, in particular down to approximately 2.2, operation was stable at higher production rate (20.0 Tonnes/hour) than Examples 1 to 3, for 500 hours and without significant agglomerate formation.

Example 5 is similar to Example 4, but with an increased ethylene flow rate such that the ratio to nitrogen flow is 4.7 (i.e. more similar to Examples 1-3). Operation again proceeded smoothly, and at higher production rate (22.0 Tonnes/hour) than Examples 1 to 3, for 500 hours without significant agglomerate formation.

The invention claimed is:

1. A process for the introduction of a polymerisation catalyst in solid form into a gas-phase fluidised bed, which process comprises using an injection device having an inner tube of internal cross-sectional area of 10 to 100 $mm^2$ and an outer tube forming an annulus around said inner tube with a cross-sectional area of 2 to 10 times the internal cross-sectional area of the inner tube, and passing said polymerisation catalyst and a carrier gas through the inner tube and into the gas-phase fluidised bed at a linear velocity of said carrier gas of 4 to 14 m/s and at a mass flow rate of carrier gas in the range of 10-35 kg/h, and passing a shielding gas through the outer tube and into the gas-phase fluidised bed at a linear velocity of said shielding gas of 1 to 10 times the linear velocity of the carrier gas through the inner tube and at a mass flow rate of the shielding gas in the range 100-500 kg/h, wherein no cooled recycle process gas is provided to the injection device.

2. A process according to claim 1 wherein the carrier gas is selected from olefins, inert gases and mixtures thereof.

3. A process according to claim 2 wherein the carrier gas is selected from ethylene and nitrogen.

4. A process according to claim 1 wherein the shielding gas is passed through the outer tube and into the gas-phase fluidised bed at a linear velocity of said shielding gas of 3 to 8 times the linear velocity of the carrier gas through the inner tube.

5. A process according to claim 1 wherein the cross-sectional area of the annulus is less than 500 $mm^2$.

6. A process according to claim 1 wherein the linear velocity of the shielding gas is less than 50 m/s.

7. A process according to claim 1 wherein the mass flow rate of the shielding gas is less than 400 kg/h.

8. A process according to claim 1 wherein the ratio of the mass flow rate of the shielding gas to the mass flow rate of the carrier gas is less than 20.

9. A process according to claim 1 wherein the shielding gas has less than 10% inert gases by volume.

10. A process according to claim 9 wherein the shielding gas comprises less than 1% inert gases by volume.

11. A process according to claim 1 wherein the shielding gas comprises at least 90% olefins by volume.

12. A process according to claim 1 wherein the catalyst is a metallocene catalyst and the shielding gas comprises predominantly ethylene.

13. A process according to claim 12 wherein the shielding gas comprises less than 1% by volume of comonomer.

14. A process according to claim 1 wherein the catalyst is a Ziegler-Natta catalyst and the shielding gas comprises at least 1% by volume of comonomer.

15. A process according to claim 3 wherein the carrier gas is selected from nitrogen.

16. A process according to claim 5 wherein the cross-sectional area of the annulus is less than 250 $mm^2$.

17. A process according to claim 5 wherein the cross-sectional area of the annulus is in the range 50 to 150 $mm^2$.

18. A process according to claim 6 wherein the linear velocity of the shielding gas is 20 to 50 m/s.

19. A process according to claim 7 wherein the mass flow rate of the shielding gas is in the range 100-300 kg/h.

20. A process according to claim 8 wherein the ratio of the mass flow rate of the shielding gas to the mass flow rate of the carrier gas is less than 15.

21. A process according to claim 8 wherein the ratio of the mass flow rate of the shielding gas to the mass flow rate of the carrier gas is in the range 5 to 15.

22. A process according to claim 11 wherein the shielding gas comprises at least 95% olefins by volume.

* * * * *